United States Patent
Thompson

(10) Patent No.: US 11,351,490 B1
(45) Date of Patent: Jun. 7, 2022

(54) COLD FILTERING OF EXTRACTION SOLUTIONS

(71) Applicant: Unified Science, LLC, Center City, MN (US)

(72) Inventor: Jonathan Thompson, Center City, MN (US)

(73) Assignee: Unified Science, LLC, Center City, MN (US)

( * ) Notice: Subject to any disclaimer, the term of this patent is extended or adjusted under 35 U.S.C. 154(b) by 0 days.

(21) Appl. No.: 16/040,097

(22) Filed: Jul. 19, 2018

Related U.S. Application Data

(60) Provisional application No. 62/590,826, filed on Nov. 27, 2017, provisional application No. 62/534,404, filed on Jul. 19, 2017.

(51) Int. Cl.
*B01D 35/18* (2006.01)
*B01D 11/02* (2006.01)
*B01D 37/00* (2006.01)

(52) U.S. Cl.
CPC .......... *B01D 35/18* (2013.01); *B01D 11/0292* (2013.01); *B01D 37/00* (2013.01)

(58) Field of Classification Search
None
See application file for complete search history.

(56) References Cited

U.S. PATENT DOCUMENTS

| | | | | |
|---|---|---|---|---|
| 1,474,899 A | * | 11/1923 | Glair et al. | B01D 35/18 |
| | | | | 210/185 |
| 1,927,057 A | * | 9/1933 | Anderson | C10G 73/02 |
| | | | | 208/33 |
| 4,265,764 A | * | 5/1981 | Gallottini | B01D 33/073 |
| | | | | 210/390 |
| 4,510,051 A | * | 4/1985 | Diry | B01D 35/18 |
| | | | | 210/94 |
| 9,926,512 B2 | * | 3/2018 | Cumings | C11B 1/10 |
| 2008/0190831 A1 | * | 8/2008 | Marchek | B01D 25/215 |
| | | | | 210/231 |
| 2010/0012597 A1 | * | 1/2010 | David | B01D 17/0217 |
| | | | | 210/774 |

* cited by examiner

*Primary Examiner* — Jason M Greene
*Assistant Examiner* — Eric J McCullough
(74) *Attorney, Agent, or Firm* — Haugen Law Firm PLLP

(57) ABSTRACT

A method for filtering a precipitatable constituent from an extraction solution through a filter apparatus includes pre-cooling at least a portion of the filter apparatus to a reduced temperature that is effective to precipitate the constituent from the extraction solution. At least the cooled portion of the filter apparatus may be thermally conductive to act as a heat sink for the extraction solution being passed through the filter apparatus. The reduced temperature facilitates removal of the precipitatable constituent from the extraction solution.

10 Claims, 7 Drawing Sheets

COLD FILTERING OF EXTRACTION SOLUTIONS

CROSS-REFERENCE TO RELATED APPLICATIONS

This application claims priority to U.S. Provisional Patent Application Ser. Nos. 62/534,404, filed on Jul. 19, 2017 and entitled "Cold Filtering Wax Solutions," and 62/590,826 filed on Nov. 27, 2017 and entitled Cold Filtering of Extraction Solutions, the contents of which being incorporated herein in their entirety.

FIELD OF THE INVENTION

The present invention relates to filtration generally, and more particularly to methods for filtering targeted constituents from extraction solutions, and more particularly botanical oil extractions to separate precipitatable constituents from valuable extractables in an extraction solution.

BACKGROUND OF THE INVENTION

Extraction can be defined as the removal of soluble material from an insoluble residue, either liquid or solid, by treatment with a solvent. Extraction is therefore a solution process that depends upon both solubility and mass transfer phenomena. Extraction techniques are often employed to separate active portions of plant tissue from the inactive or inert components using appropriate solvents. While traditional solvent extraction, such as liquid-liquid extraction and partitioning, is a well-known approach to separate compounds based upon their relative solubility in two different immiscible liquids, its performance and desirability are limited due to slow raw material penetration rates by the solvent, and because traditional solvents of the required purity tend to be expensive, and can also cause problems with proper disposal after use. For this reason, supercritical solvent extraction is commonly employed for the extraction of botanical oils from plant tissue.

In many application, raw extraction product from plant matter includes both the valuable botanical oils, as well as impurities such as plant lipids and waxes. One approach to purifying the botanical extract is to re-dissolve the extract into a dewaxing or winterizing solvent, which can then be cooled to force a precipitation of plant lipids and waxes, thereby stripping out impurities from the targeted botanical oils of the extract. Filtration of the cooled extraction solution is not without challenges, particularly in avoiding re-solubilizing the wax and lipid constituents prior to removal from the solution at the filter.

Typical problems encountered in removing wax constituents from cooled extraction solutions include the build-up of a "filter cake", which is retentate filtered from the extraction solution. As a filtrate builds up upon the filter during the filtration process, time to filter the extraction solution increases substantially, thereby permitting the extraction solution to warm toward ambient conditions. Such warming increases the solubility of wax constituents in the extraction solution, thereby frustrating the goal of filtration. Another source for premature warming of the extraction solution is contact made between the extraction solution and various portions of the filtration apparatus which are likely to be at ambient room temperature. In some cases, filtration apparatus is fabricated from thermally conductive material that is efficient in transferring thermal energy to the cooled extraction solution. As a result, the extraction solution can quickly warm upon contact with the filtration apparatus, and cause significant re-solubilization of the precipitated wax constituents.

It is therefore an object of the invention to provide a method and apparatus in which the temperature of the extraction solution is cooled or maintained cool by the filtration apparatus during the filtration process.

SUMMARY OF THE INVENTION

By means of the present invention, wax constituents of an extraction solution may be effectively removed from the extraction solution through precipitation and filtration. The wax constituents may be maintained as a precipitate by cooling or maintaining the extraction solution at a sufficiently reduced threshold temperature throughout the filtration procedure. The threshold temperature of the extraction solution may be at a temperature at or below that which is effective to precipitate the wax constituent from the extraction solution. The threshold temperature of the extraction solution may be attained and maintained through the filtration process by pre-cooling one or more portions of the filtration apparatus, wherein transfer of thermal energy to the extraction solution is limited or eliminated. In some cases, thermal energy may be transferred from the extraction solution to the filtration apparatus during the filtration procedure.

In one embodiment, a method for filtering a wax constituent from an extraction solution through a filter apparatus includes cooling a portion of the filter apparatus to a temperature effective to precipitate the wax constituent from the extraction solution, and contacting the cooled portion of the filter apparatus with the extraction solution. The extraction solution is simultaneously or thereafter passed through a filter element of the filter apparatus.

In another embodiment, a method for filtering a precipitatable constituent from an extrusion solution through a filter apparatus includes cooling a portion of the filter apparatus, and contacting the cooled portion of the filter apparatus with the extraction solution so that thermal energy is transferred from the extraction solution to the cooled portion of the filter apparatus. The extraction solution is simultaneously or thereafter passed through a filter element of the filter apparatus.

DETAILED DESCRIPTION OF THE PREFERRED EMBODIMENTS

The objects and advantages enumerated above together with other objects, features, and advances represented by the present invention will now be presented in terms of detailed embodiments which are intended to be representative of various possible embodiments of the invention. Other embodiments and aspects of the invention are recognized as being within the grasp of those having ordinary skill in the art.

In some embodiments of the present invention, the extraction sample may be a botanical material, with the extractant being one or more substances naturally found in the botanical material. The natural substances form at least a portion of the extractants, and may include oils and waxes that may find applications separate and distinct from the botanical materials. The system and method of the present invention facilitates the removal of such oil, lipid, and wax constituents from an extraction solution.

Figure 1:
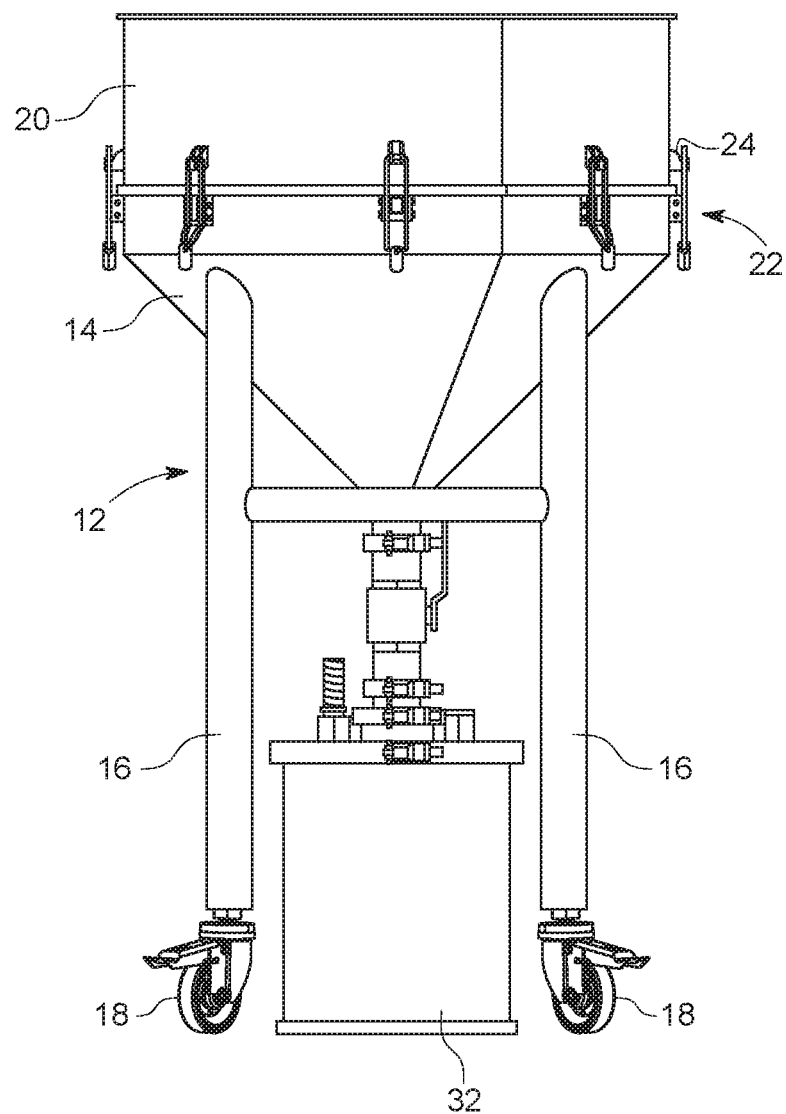
FIG. 1 is an elevational view of a filter apparatus of the present invention.

An example filter/filtration apparatus 10 useful in the filtration method of the present invention is illustrated in FIG. 1, and includes a frame 12 with a funnel portion 14 suspended by legs 16 and castors 18. A reservoir body 20 may be secured to funnel portion 14 of frame 12 with clamps 22 connecting to hooks 24 extending from an outer surface of reservoir body 20.

Figure 2:
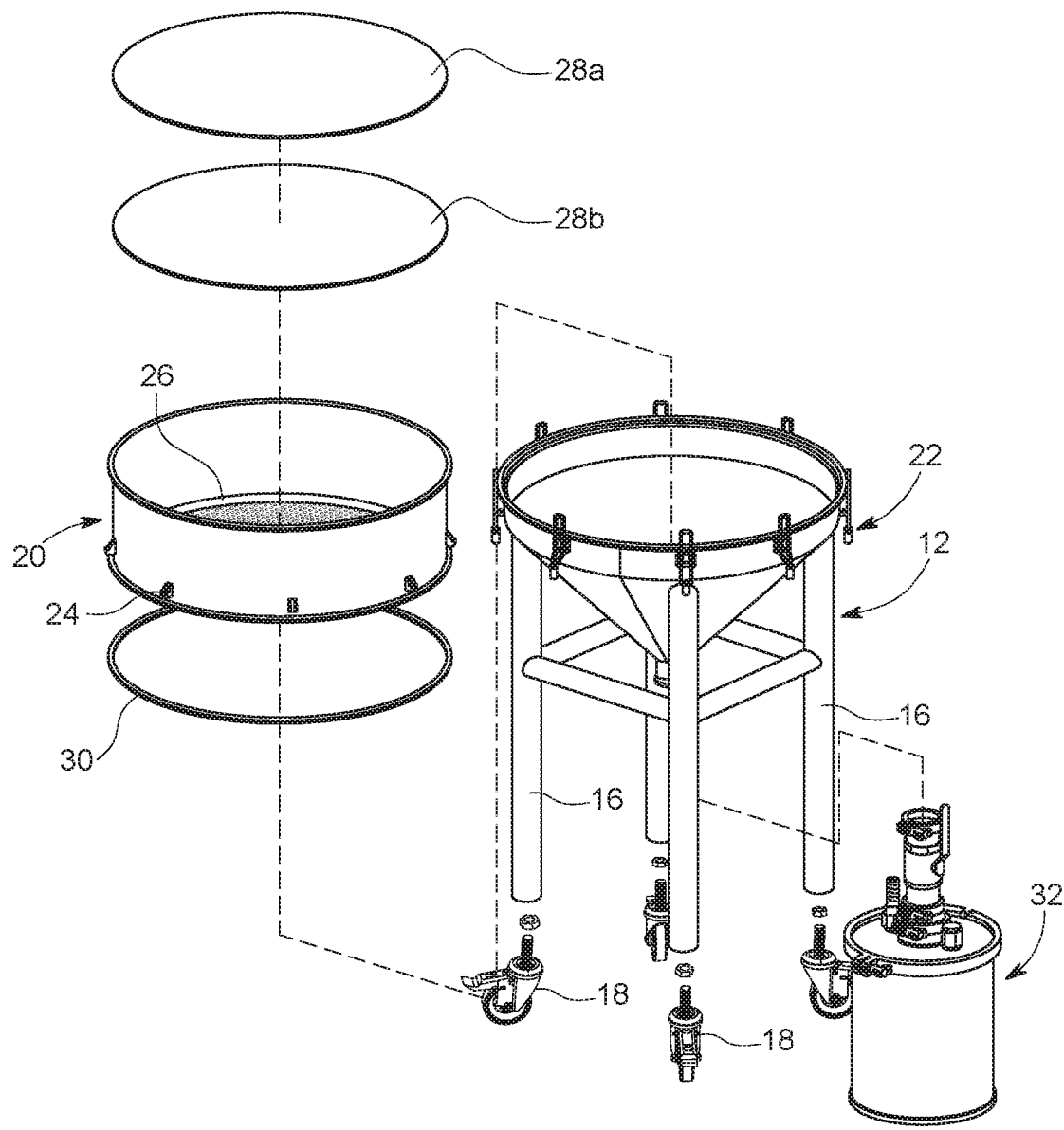
FIG. 2 is an exploded perspective view of the filter apparatus of FIG. 1.
Figure 3:
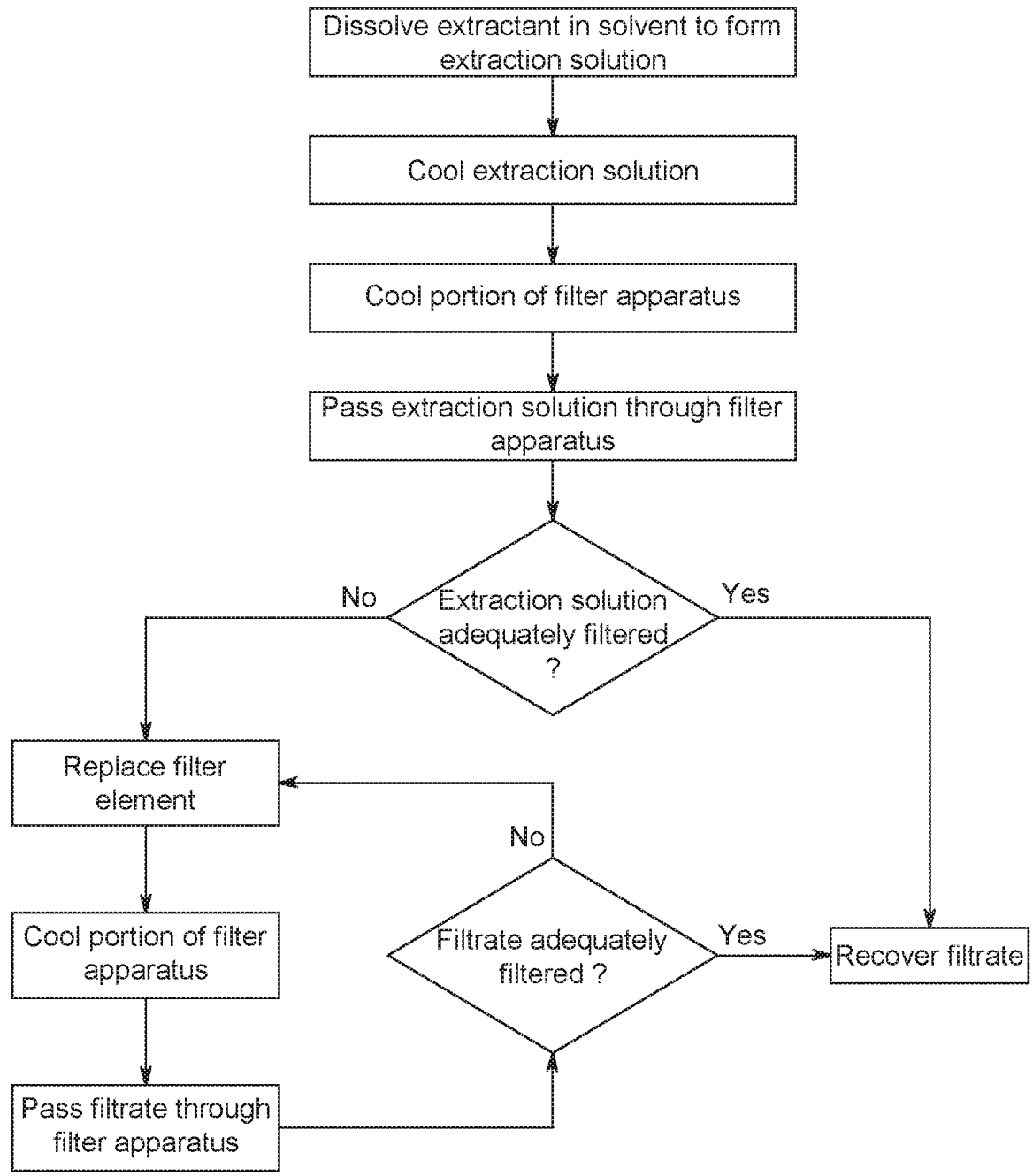
FIG. 3 is a flow diagram describing a filtering method of the present invention.

As shown in the exploded view of FIG. 2, filter apparatus 10 includes a perforated filter support 26 and one or more filter media layers 28a, 28b. The assembly is sealingly secured to funnel portion 14 of frame 12, with an O-ring 30. Filter media layers 28a, 28b may be used individually or in combination, either simultaneously or sequentially, to filter precipitate material from an extraction solution. Retentate is therefore prevented from passing through perforated support 26, while filtrate is permitted to pass therethrough into drain tank 32. For the filtration of extraction solutions, it is contemplated that the filtrate material contains the desirable constituents of the extraction solution, such as the targeted botanical oils, while the retentate includes other constituents, such as oil, lipids, and waxes. The one or more filter media layers 28a, 28b may be in operation supported by perforated filter support 26, wherein the one or more filter media layers 28a, 28b are contacted with the extraction solution, and permit filtrate to pass therethrough and thence through perforated filter support 26, while preventing retentate material from passing therethrough.

One or more portions of filter apparatus 10 may be fabricated from one or more materials that exhibit a relatively high level of thermal conductivity, such as at least about 10 W/m*K. Examples of such thermally conductive portions include funnel portion 14, reservoir body 20, and perforated filter support 26. Other portions of filter apparatus 10 may exhibit the desired threshold of thermal conductivity of at least about 10 W/m*K, and/or other portions or components not illustrated in the example embodiments may also or instead exhibit such thermal conductivity. At least such portions of filter apparatus 10 may be fabricated from stainless steel, copper, aluminum, bronze, carbon steel, tin, brass, iron, and combinations thereof. The one or more filter media layers 28a, 28b may be any suitable material for filtering the extraction solution. Example materials include cellulose and polypropylene with example pore sizes between 1-1,000 micrometers, and more preferably 5-200 micrometers. In some embodiments, filter media layers 28a, 28b may be doped with a chemical sorbent, with sorption selectivity directed toward colorants, fatty acids, hydrophilic species, and/or hydrophobic species.

Certain constituents in extraction solutions may be considered impurities relevant to other extractants within the solution. With respect to botanical extractions, wax constituents may be considered impurities extracted from the plant material along with botanical oils. In order to separate certain extractant constituents from other extractant constituents, the extractant may be dissolved in a solvent to create an extraction solution. Solvents may be polar or nonpolar, with common solvents including ethanol and butane. An example ethanol extraction solution contains between about 0.01-1 gram of extract per 1 ml of ethanol. In some cases, elevating the temperature of the ethanol to between about 30-60° C. can aid in dissolving the extract in the ethanol solvent. Once the extract is dissolved and/or suspended in the solvent to form the extraction solution, it is preferable that the extraction solution be cooled to a temperature of less than 0° C. A common technique for cooling the extraction solution is to place the extraction solution in a freezer for a sufficient period of time, such as at least about 24 hours. In some embodiments, it may be preferable to cool the extraction solution to a temperature of between −20−−40° C. The cooled extraction solution preferably precipitates at least some extractant constituents from a solution/suspension state in the extraction solution. At least some wax constituents are an example of extractant species that may precipitate out from solution/suspension when cooled to a temperature of less than 0° C., and more preferably less than −20° C.

To effectively filter the precipitatable extractants from the solution/suspension, it is desirable to cool the extraction solution to or below a temperature that causes precipitation of the target extractant species. One approach, as described above, for cooling the extraction solution is to place the extraction solution in a cooled environment prior to the filtering process. Doing so, however, adds substantial time to the overall extractant recovery process. Moreover, relying upon the pre-cooled extractant solution to adequately filter precipitated extractant species can be problematic in the event that substantial thermal energy is transferred from the filter apparatus to the extractant solution prior to undergoing the filtering process. Accordingly, Applicant has found that cooling at least a portion of filter apparatus 10 can substantially aid in efficiently filtering at least some precipitatable extractant species from the extractant solution.

Prior to, or simultaneously with, filtering the cooled extraction solution, a portion of filter apparatus 10 is cooled to a temperature that is effective to precipitate the impurity constituent, such as the wax constituent of the extractant from the extraction solution. Thus, the portion or portions of the filter apparatus are preferably cooled to a temperature of less than 0° C., and more preferably less than −20° C. In some embodiments, the portion of filter apparatus 10 is cooled to between −20 and −80° C. Such temperatures, as described above, are effective in precipitating at least some constituents from their solution/suspension state in the extraction solution. In some embodiments, the cooled portion of filter apparatus 10 may be cooled to a temperature that is less than the temperature of the extraction solution, which may be an ambient room temperature, or pre-cooled below ambient temperature. In such embodiment, the cooled portion of filter apparatus 10 may act as a heat sink to the extraction solution, thereby driving a transfer of thermal energy from the extraction solution to the cooled portion of filter apparatus 10. This arrangement seeks to at least limit the warming of the extraction solution, and more preferably maintain or decrease the temperature of the extraction solution, thereby limiting or eliminating re-solubization or suspension of the precipitated extractant constituent into the extraction solution. In some cases, preparing a portion of filter apparatus 10 as a heat sink may even promote further precipitation of target extractant constituents from a pre-cooled extraction solution during the filtration procedure.

Applicant has determined that cooling the portion or portions of filter apparatus 10 that contact the extraction solution prior to or during the filtering procedure are preferably cooled to or below the target reduced temperature. In some embodiments, at least perforated filter support 26 is cooled to the target reduced temperature prior to filtering the cooled extraction solution. In some embodiments, reservoir body 20 and perforated filter support 26 are cooled to the target reduced temperature prior to the filtering procedure. Other portions of filter apparatus 10 may also or instead be cooled to a reduced temperature prior to the filtering procedure, including funnel portion 14, filer media layers 28a, 28b, and drain tank 32. It is contemplated that a strategy in cooling one or more portions of filter apparatus 10 is to select the one or more portions of filter apparatus 10 for cooling that will aid in limiting or eliminating re-solubilization/suspension of the precipitated extractant constituents into the extraction solution prior to or simultaneously with passing the extraction solution through a filter media to separate the precipitated constituents from the extraction solution. Accordingly, portions of filter apparatus 10 that may contact the extraction solution prior to or during separation of the precipitated constituents are good candidates for pre-cooling prior to the filtration procedure.

In some embodiments as described above, at least portions of filter apparatus 10 may act as a heat sink to the extraction solution during the filtration procedure. To facilitate the heat sinking characteristic, such portions of filter apparatus 10 may exhibit a relatively high degree of thermal conductivity, such as at least about 10 W/m*K. Example materials exhibiting such thermal conductivity include stainless steel, cooper, aluminum, bronze, carbon steel, tin, brass, iron, and alloys and combinations thereof. Such example materials are effective in conductively accepting thermal energy from the extraction solution. Moreover, materials exhibiting high thermal conductivity may be efficiently re-cooled to the target reduced temperature.

Several techniques for cooling one or more portions of filter apparatus 10 are contemplated by the present invention. In general, the portion of filter apparatus 10, or the entirety of filter apparatus 10, may be thermally coupled to a cooling media, which conductively or convectively cools the designated portion or entirety of filter apparatus 10. The cooling media may be in solid form or fluid form, either liquidous or gaseous, and may cool the filter apparatus 10 either indirectly through an intervening body or media, or directly. In some embodiments, at least a portion of filter apparatus 10 may be directly contacted with the cooling media. Example direct contact techniques include pouring a cooling fluid, such as liquid nitrogen, through filter apparatus 10 immediately prior to the filtering of the extraction solution through filter apparatus 10. Another example cooling media is solid carbon dioxide (dry ice). In some embodiments, the cooling fluid may be passed through one or more filter media layers 28a, 28b to both cool such filter media layers 28a, 28b, and to enhance thermally conductive contact between filter media layers 28a, 28b and perforated filter support 26, such that the relatively larger thermal capacity of a metal perforated filter support 26 may continue to withdraw thermal energy from filter media layers 28a, 28b prior to and during the filtration procedure upon the extraction solution. It is further desired that the extraction solution be passed through a filter element of filter apparatus 10 immediately or shortly following the cooling of at least a portion of filter apparatus 10, so that the benefit of a cooled filter apparatus 10 is most pronounced. It is also preferable to contact the cooled portion of filter apparatus 10 with the extraction solution to realize the benefit of cooling filter apparatus 10. The "cooled portion" of filter apparatus 10 may include portions of filter apparatus 10 that are cooled indirectly by the cooling procedure, such as through thermal conduction of portions of filter apparatus 10 not directly contacted by the cooling media. For example, portions of filter apparatus 10 directly contacted by a cooling media may be effective in cooling other portions of filter apparatus 10 by conductively withdrawing thermal energy therefrom. Such cooling may be maintained during the filtering procedure.

Figure 4A:
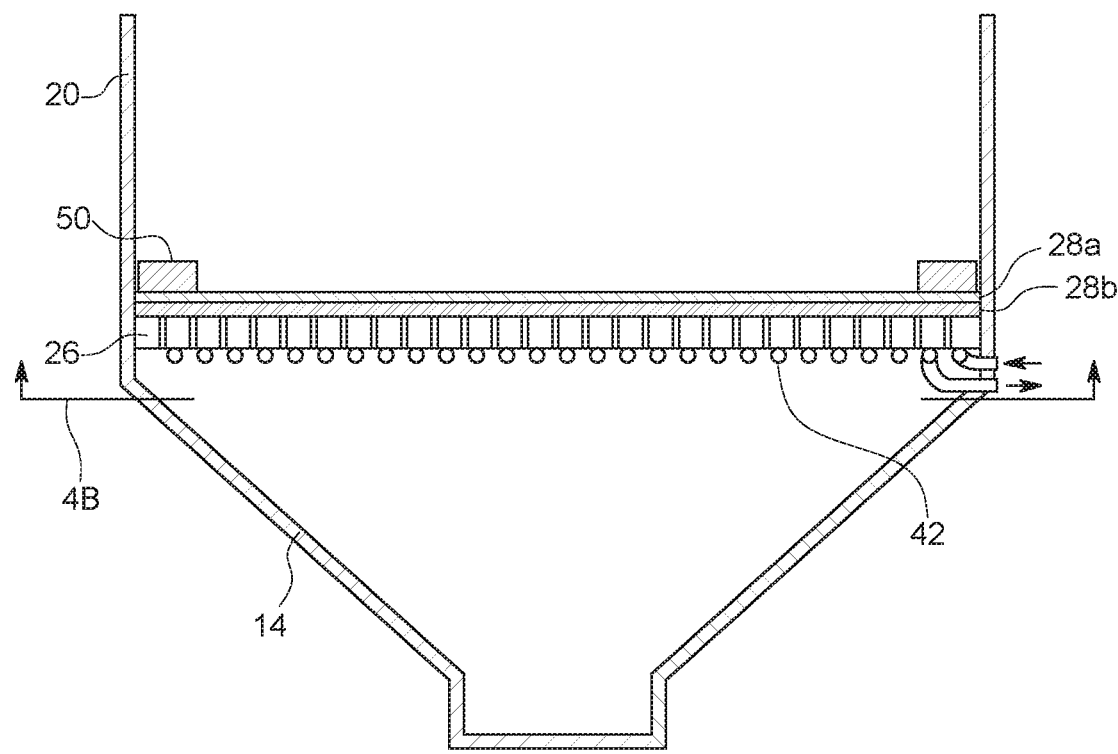
FIG. 4A is a cross-sectional view of a portion of a filter apparatus of the present invention.
Figure 4B:
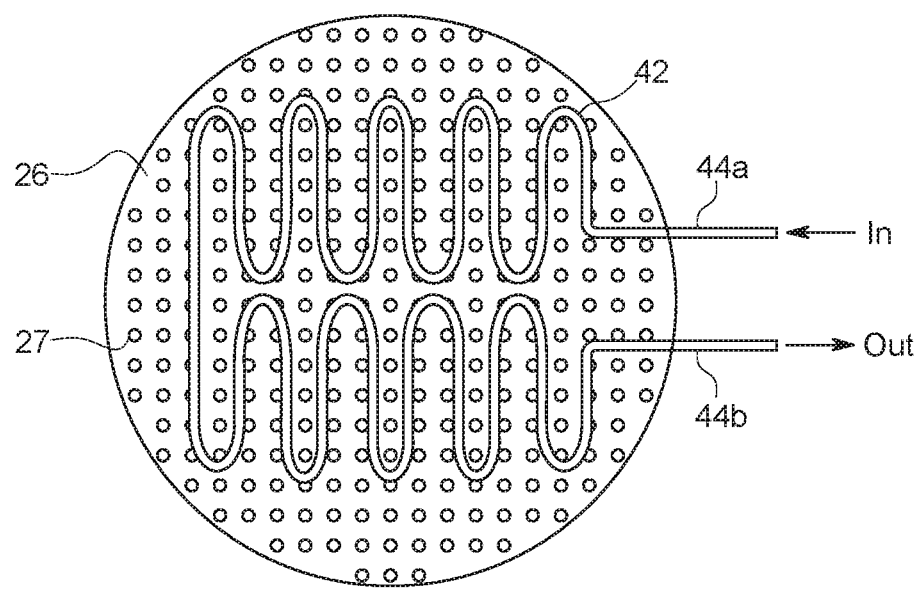
FIG. 4B is a bottom plan view taken along cut line 4B-4B in FIG. 4A.

At least a portion of filter apparatus 10 may be maintained in a cooled condition with an active cooling mechanism such as a heat exchanger thermally coupled to at least a portion of filter apparatus 10. An example such heat exchanger apparatus is illustrated in FIGS. 4A and 4B, wherein coolant tubing 42 may be welded or otherwise thermally coupled to filter support 26. Side ports 44a, 44b may be connected into reservoir body 20 and/or funnel portion 14 so that one or more lines of coolant tubing 42 may be fluidly connected to a source of coolant fluid (not shown). An example cooling tubing 42 may be fabricated from stainless steel with an inside diameter of between about 0.1-0.5 inches. Coolant tubing 42 may be provided in a variety of arrangements to appropriately thermally connect to filter support 26. In the illustrated embodiment, coolant tubing 42 is arranged in a serpentine configuration and connected to inlet and outlet side ports 44a, 44b. Coolant tubing 42 may be arranged to minimize interference with filtrate flow through perforations 27 in filter support 26. Coolant tubing 42 may be fabricated from any material that is effective in thermal energy transfer, and particularly to withdraw thermal energy from filter support 26. To aid in doing so, a coolant fluid, such as ethanol, propylene glycol, or other appropriate cooling fluid may be passed through one or more lumens defined by coolant tubing 42.

In some embodiments, it has been found that a retention ring 50 may be employed to assist in securing one or more filtering media layers 28a, 28b to perforated filter support 26. Applicant has found that, at least in some cases, one or more of filter media layers 28a, 28b may "curl" at their periphery during the filtration procedure, wherein regions of the filter media discontinuously exposed to the extraction solution may begin to dry in the absence of continued exposure to the extraction solution. The drying of the filter media can lead to the curling effect at the periphery of the filter media, even when filtration is ongoing at other regions of the filter media. The curling of the periphery of the filter media can permit bypass of the extraction solution past the filter media at the portions of the perforated filter support 26 left exposed by the curled filter media. To counteract the curling effect of the filter media, therefore, retention ring 50 may be placed at, or secured to the one or more layers of filter media 28a, 28b. In some embodiments, retention ring 50 need only be placed at or secured to a peripheral region of the filter media to counteract the curling effect. Retention ring 50 is preferably configured and of sufficient mass to hold the one or more filter media layers in a desired configuration, such as against filter support 26. In one example embodiment, retention ring 50 may be fabricated from stainless steel.

Figure 5:
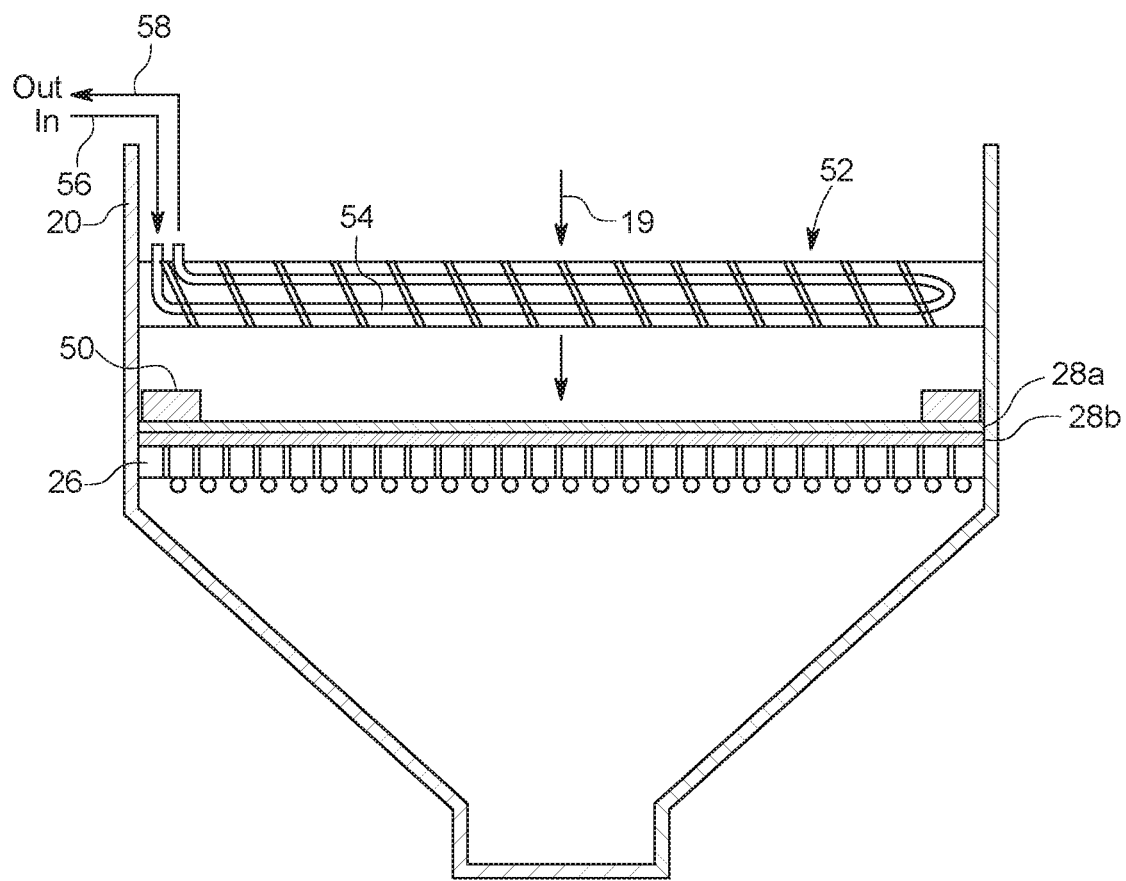
FIG. 5 is a cross-sectional view of a portion of a filter apparatus of the present invention.

Another approach to removing impurity constituents from an extractant in an extractant solution is to contact the extraction solution with a cooled plate prior to passing the extraction solution through the filter apparatus. In such an embodiment, a plate or other body may be cooled to a target reduced temperature, thereafter contacted with the extraction solution to promote precipitation of certain constituents of the extraction solution prior to passing the extraction solution through the filter apparatus. An example cooled body for contacting the extraction solution prior to passing the extraction solution through the filter apparatus is illustrated in FIG. 5, wherein a radiator 52 may be secured to reservoir body 20 above, or otherwise upstream from one or more filter media layers 28a, 28b. Radiator 52 is perforated to permit extraction solution flow therethrough generally along direction 19, and is cooled to act as a heat exchanger to remove thermal energy from the extraction solution. Radiator 52 may be coupled to a cooling source, such as a cooling fluid like ethanol or propylene glycol that flows through internal passages 54 in radiator 52. As shown in FIG. 5, the cooling fluid may be provided from a cooling fluid source (not shown) to internal passages 54 through a cooling fluid inlet 56, and returned to the cooling fluid source via cooling fluid outlet 58. In some embodiments, the cooling fluid source may maintain the cooling fluid at a temperature of between about −20 and −80° C. Conductive heat transfer from the internal passages 54 to the cooling fluid at such reduced temperature causes radiator 52 to be chilled under use. Pouring the extraction solution over and through radiator 52 preferably causes precipitation of at least a portion of precipitatable extractants in the extraction solution. Radiator 52 may also aid in distributing flow of extraction solution across the surface area of one or more filter media layers 28a, 28b.

Applicant has determined that filtration of the extraction solution sequentially through a series of filter elements 28a, 28b may most effectively remove impurity constituents from the extraction solution. An example approach may be to utilize a series of filter media layers 28a, 28b sequentially in descending pore size layers. For example, a first pass of the extraction solution through filter apparatus 10 may employ a filter media layer 28a having a minimum pore size of 20 micrometers. The filter element 28a may be replaced with a new filter element 28b having a minimum pore size of 10 micrometers, and the filtrate passed through filter apparatus 10 with the replacement filter element in place. This replacement and re-filtration procedure can be repeated as necessary to adequately filter the original extraction solution. In some embodiments, at least a portion of filter apparatus 10 may be re-cooled between each filtration pass. For example, after the first pass of the extraction solution through the 20 micrometer filter element, such filter element may be replaced with the next filter element, and at least a portion of filter apparatus 10 may be contacted with a cooling fluid media to re-cool at least a portion of filter apparatus 10 to a target reduced temperature.

Figure 6:
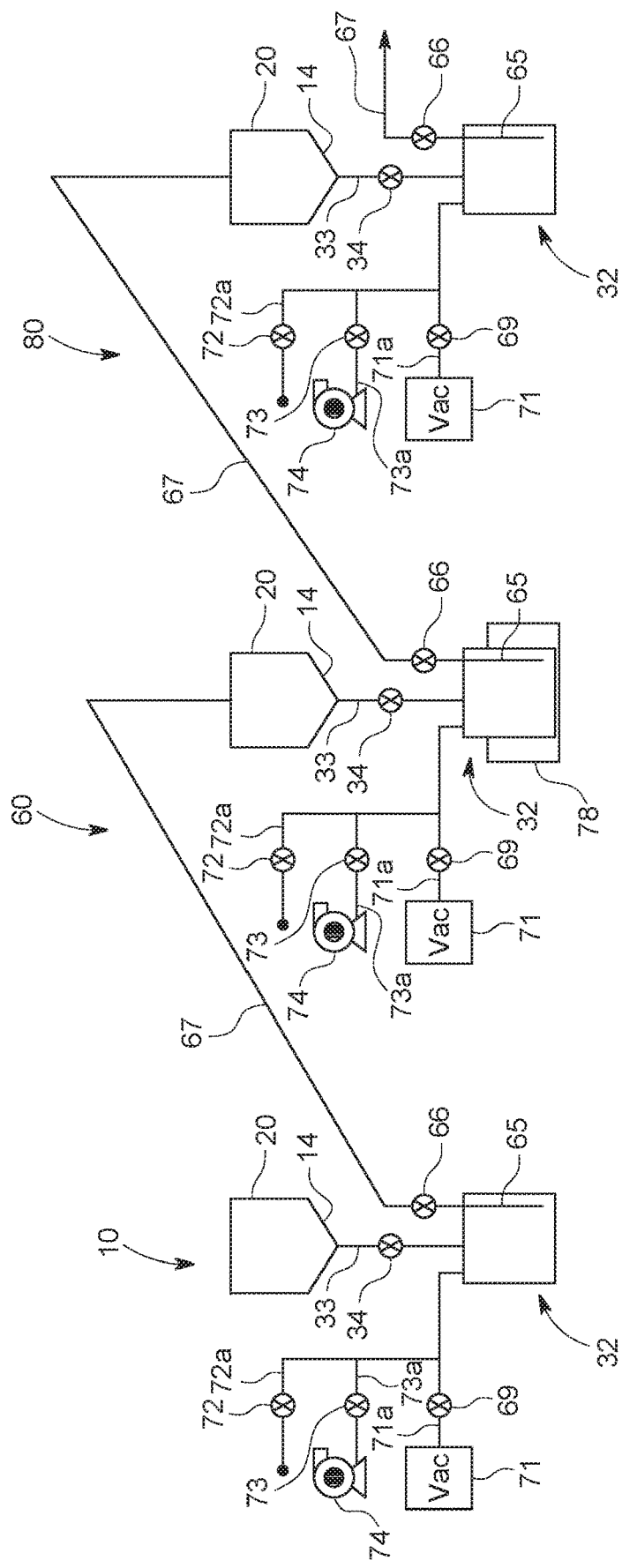
FIG. 6 is a schematic diagram of a filter apparatus of the present invention.
Figure 7:
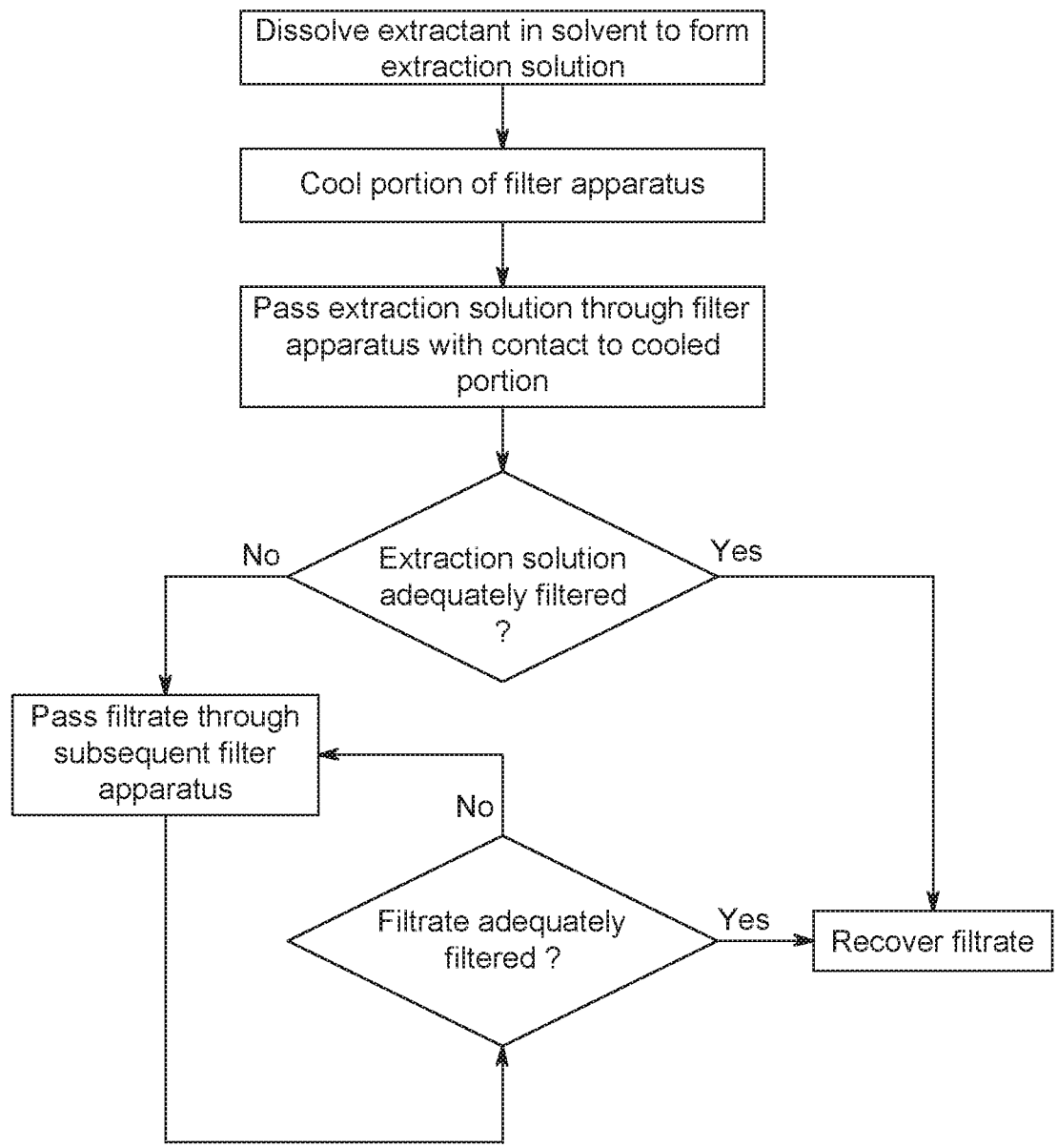
FIG. 7 is a flow diagram describing a filtering method of the present invention.

In some embodiments, filtrate may be automatically transferred to additional filter apparatus for re-filtration. FIG. 6 schematically illustrates a cascade filtering apparatus 90 that employs a first filter apparatus 10, a second filter apparatus 60, and a third filter apparatus 80. First filter apparatus 10 is substantially as described hereinabove, including a reservoir body 20 with one or more filter media layers, a funnel portion 14, and a drain tank 32. A drain valve 34 controls flow of filtrate through drain line 33 to drain tank 32. Filtrate collected in drain tank 32 of first filter apparatus 10 may be directed to second apparatus 60 through exit tube 67. Transfer of filtrate to a subsequent filter apparatus may be performed by a control system (not shown) operating an array of valves of system 90. In the illustrated embodiment, filtrate collected in drain tank 32 of first filter apparatus 10 may be transferred through exit tube 67 by first closing drain valve 34, and opening exit valve 66 in exit tube 67. Exit tube 67 is coupled to a dip tube 65 that is open to the filtrate in drain tank 32.

The control system may next close vacuum valve 69, which may otherwise remain open during the filtration process to maintain a reduced pressure within drain tank 32. Vacuum valve 69 regulates access to the interior of drain tank 32 from a vacuum source 71, such as a vacuum pump connected to vacuum line 71a. A vent valve 72 may be opened by the control system to vent the interior of drain tank 32 to atmosphere. Vent valve 72 and vent line 72a are optionally included in system 90. In order to motivate filtrate from drain tank 32 out through exit tube 67, the control system may open pressure valve 73, thereby permitting pressurized gas, such as pressurized air, to flow through pressure line 73a as motivated by a pressurized fluid source, such as pump 74. In some embodiments, the pressurized gas, such as pressurized air, may be provided at about 20 psi to adequately motivate the filtrate from drain tank 32 into dip tube 65 and through an open exit valve 66 into exit tube 67. Once the filtrate is expunged from drain tank 32 in first filter apparatus 10, the control system may re-set the valves for a subsequent batch of extractant solution filtration. The process is repeated for each of second and third filter apparatus 60, 80.

In some embodiments, drain tank 32 may be disposed in a cooling chamber or other heat exchanger 78 to maintain filtrate at a reduced temperature in drain tank 32. In some embodiments, heat exchanger 78 may be an ice bath, though a variety of cooling chamber configurations are contemplated by the present invention. Such cooling chamber or heat exchanger 78 may be employed at one or more of the drain tanks 32 of system 90.

The invention has been described herein in considerable detail in order to comply with the patent statutes, and to provide those skilled in the art with the information needed to apply the novel principles, and to construct and use embodiments of the invention as required. However, it is to be understood that various modifications may be accomplished without departing from the scope of the invention itself.

What is claimed is:

1. A method for filtering a wax constituent from an extraction solution through a filter apparatus having a funnel portion with a tapered wall, a reservoir body extending from the tapered wall, a filter media, a perforated metal filter media support for supporting the filter media, the perforated metal filter media support having a support portion with a first surface contactable by the filter media, and a second opposed surface, the filter apparatus further including a first heat exchanger in contact with the second surface of the support portion of the support, and a second heat exchanger defining a perforated thermally conductive body secured to at least one of the tapered wall and the reservoir body, the method comprising:

(a) cooling the first and second heat exchangers and the support to one or more temperatures effective to precipitate the wax constituent from the extraction solution;

(b) subsequent to step (a), passing the extraction solution through the perforations of the cooled second heat exchanger; and (c) subsequent to step (b), passing the extraction solution through the filter media and the cooled support.

2. The method as in claim 1 wherein the perforated metal filter media support exhibits a thermal conductivity of at least about 10 W/m*K.

3. The method as in claim 2 wherein the support is selected from the group consisting of stainless steel, copper, aluminum, bronze, carbon steel, tin, brass, iron, and combinations thereof.

4. The method as in claim 1, including cooling the first and second heat exchangers to less than 0° C.

5. The method as in claim 4, including cooling the first and second heat exchangers to between −20--80° C.

6. The method as in claim 1, including conductively cooling the support with the first heat exchanger.

7. The method as in claim 1 wherein the filter includes a drain tank for collecting the extraction solution subsequent to passing through the filter media.

8. The method as in claim 7, including conductively cooling at least one of the funnel portion and the drain tank prior to passing the extraction solution through the filter media.

9. The method as in claim 1, wherein the filter media is non-metal.

10. The method as in claim 9, including removing and replacing the filter media after each pass of extraction solution through the filter apparatus.

\* \* \* \* \*